United States Patent [19]

Hotta et al.

[11] Patent Number: 5,274,626
[45] Date of Patent: Dec. 28, 1993

[54] EARTH STATION CAPABLE OF CARRYING OUT COMMUNICATION WITHOUT A CONTROL STATION

[75] Inventors: Toshinori Hotta; Yuji Goto, both of Tokyo, Japan

[73] Assignee: NEC Corporation, Tokyo, Japan

[21] Appl. No.: 474,500

[22] Filed: Feb. 2, 1990

[30] Foreign Application Priority Data

Feb. 3, 1989 [JP]  Japan ................................. 1-24871

[51] Int. Cl.$^5$ ................................................ H04J 3/26
[52] U.S. Cl. ........................................ 370/31; 370/92; 370/95.3
[58] Field of Search .............. 370/106.1, 94.1, 95.3, 370/31, 97, 95.1, 85.2, 85.3, 85.7, 30, 50, 75, 92; 371/62; 455/12.1

[56] References Cited

U.S. PATENT DOCUMENTS

| Re. 32,905 | 4/1989 | Baron ............................ 370/104.1 |
| 4,135,156 | 1/1979 | Sanders, Jr. et al. ............ 370/104.1 |
| 4,288,868 | 9/1981 | Grotjohann et al. ............... 370/31 |
| 4,320,504 | 3/1982 | Alvarez ........................... 370/104.1 |
| 4,574,378 | 3/1986 | Kobayashi ........................ 370/95.3 |
| 4,594,706 | 6/1986 | Kobayashi ........................ 370/95.3 |
| 4,599,720 | 7/1986 | Kunzinger ....................... 370/104.1 |
| 4,617,657 | 10/1986 | Drynan et al. .................... 370/94.1 |
| 4,630,267 | 12/1986 | Costes et al. .................... 370/104.1 |
| 4,639,937 | 1/1987 | McRae et al. ...................... 375/40 |
| 5,012,469 | 4/1991 | Sardana .......................... 370/95.3 |

OTHER PUBLICATIONS

Patents abstracts of Japan, E-473, Jan. 22, 1987, vol. 11/No. 23, Masahito Maeda, "Multipled address communication system in satellite", 61-193525(A).
Patents abstracts of Japan, E-162, Mar. 2, 1983, vol. 7/No. 52, Seiichi Nakajima, "Assignment controlling system for satellite line", 57-202140(A).

*Primary Examiner*—Douglas W. Olms
*Assistant Examiner*—Melvin Marielo
*Attorney, Agent, or Firm*—Laff, Whitesel, Conte & Saret

[57] ABSTRACT

In an earth station having a particular address and comprising a terminal and a transmitting section for transmitting a transmission data signal including an address signal representative of the particular address towards a satellite through a single communication channel, a receiving section receives a reception data signal comprising the transmission data signal which is sent from the satellite through the single communication channel. By detecting the particular address, a decision circuit decides whether or not the receiving section correctly receives the reception data signal within a predetermined time interval after the transmitting section starts transmission of the transmission data signal. When the receiving section does not correctly receive the reception data signal, the transmitting section stops the transmission of the transmission data signal and an alarm signal is supplied to the terminal. Alternatively, the transmission data signal may include another address signal representative of another address of another earth station.

3 Claims, 5 Drawing Sheets

EARTH STATION CAPABLE OF CARRYING OUT COMMUNICATION WITHOUT A CONTROL STATION

BACKGROUND OF THE INVENTION

This invention relates to an earth station for carrying out communication in a satellite communication system through a single satellite.

As a satellite communication system, a demand assigned multiple access system is well known in the art. The demand assigned multiple access system comprises a satellite, a control station, and first and second earth stations each of which includes first and second terminals. The first and the second earth stations are communicable with each other through a radio transmission path as first and second communication channels of first and second frequency bands which are assigned by the control station in the following manner. The first earth station transmits a connection demand signal to the control station through the satellite by using a common control channel of a common frequency band when the first terminal produces a transmission request signal in order to communicate with the second terminal of the second earth station. On reception of the connection demand signal, the control station transmits a first channel assignment signal representative of the first communication channel to the first earth station by using the common control channel. Responsive to the first channel assignment signal, the first earth station transmits a first transmission data signal through the first communication channel towards the satellite. On the other hand, the control station transmits a second channel assignment signal representative of the second communication channel to the second earth station by using the common control channel in order to prevent a collision of signals. Responsive to the second channel assignment signal, the second earth station transmits a second transmission data signal as a response transmission data signal through the second communication channel towards the satellite. Thus, the first and the second earth stations are communicable with one another.

In order to transmit the connection demand signal and to receive the first and the second channel assignment signals, each of the first and the second earth stations requires a transmitter and a receiver for the common control channel. It is to be noted that the demand assigned multiple access system becomes expensive and complex in structure because the control station should be included in the demand assigned multiple access system. Furthermore, the demand assigned multiple access system has a reduced availability of the radio transmission path because the common control channel should be used for the connection demand signal and the first and the second channel assignment signals. It should furthermore be noted that one of the first and the second earth stations can be called afresh as a first earth station without loss of generality.

SUMMARY OF THE INVENTION

It is therefore an object of this invention to provide an earth station which is suitable for a satellite communication system capable of communicating without a control station.

Other objects of this invention will become clear as the description proceeds.

On describing the gist of this invention, it is possible to understand that an earth station is for use in a satellite communication system. The earth station is communicable with at least one other earth station through a satellite by using a single communication channel by half duplex basis and also communicable with the other earth station through the satellite using two communication channels by full duplex basis. Each of the earth station and the other earth station has each particular address and includes a terminal for producing a transmission request signal and subsequently an output data signal, transmitting means for transmitting a modulator input signal as a transmission data signal towards the satellite through the communication channel when the transmitting means is supplied with the transmission request signal, and receiving means for receiving a reception data signal from the satellite through the communication channel.

According to this invention, the above-mentioned earth station comprises generating means for generating an address signal representative of each particular address, a multiplexer connected to the terminal and the generating means for multiplexing the output data signal and the address signal into a multiplexed signal, and supply means connected to the transmitting means and the multiplexer for supplying the multiplexed signal to the transmitting means as the modulator input signal. The reception data signal comprises the transmission data signal which is sent back to the receiving means as a returning data signal through the satellite. The earth station comprises deciding means connected to the transmitting and the receiving means for deciding whether or not the receiving means already receives other earth stations signal when the transmitting means starts to transmit and whether or not the receiving means receives the returning data signal as the reception data signal within a predetermined time interval after the transmitting means starts transmission of the transmission data signal. The deciding means produces a fault signal when the receiving means already receives other earth stations signal when the transmitting means starts to transmit and the receiving means does not detect each particular address within the predetermined time interval. The earth station further comprises control means connected to the transmitting means and the deciding means for controlling the transmitting means to stop the transmission when the deciding means produces the fault signal.

BRIEF DESCRIPTION OF THE DRAWING

FIG. 1, shows format of a transmission data signal transmitted from the earth station illustrated in FIG. 2;

FIG. 4, shows format of a transmission data signal transmitted from the earth station illustrated in FIG. 5.

DESCRIPTION OF THE PREFERRED EMBODIMENT

Figure 1:
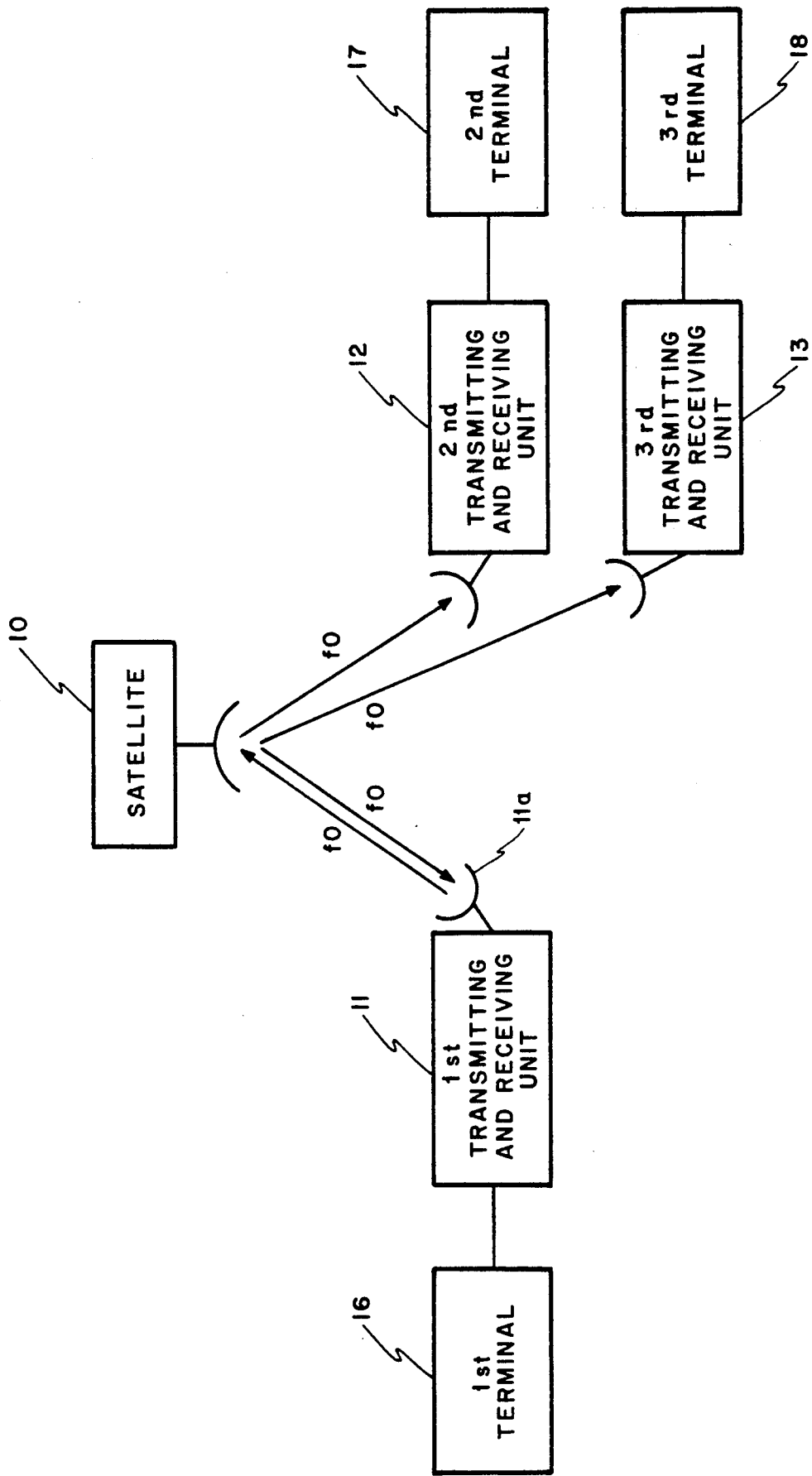
FIG. 1 schematically shows a satellite communication system which comprises a plurality of earth stations according to a first embodiment of this invention.

Referring to FIG. 1, the description will be made as regards a satellite communication system including an earth station according to a first embodiment of this invention. The system is of an SCPC (single channel per carrier) system using a single communication channel of a predetermined frequency band f0 as a radio transmission path. The system comprises a satellite 10 and a plurality of earth stations. In the example being illustrated, only three earth stations are exemplified as first through third earth stations which are communicable with each other by half duplex basis and which include first through third transmitting and receiving units 11, 12, and 13 and first through third terminals 16, 17, and 18, respectively. The first through the third earth stations are also communicable with each other through the satellite 10 by using the communication channels by full duplex basis. The first through the third earth stations have first through third addresses SN1, SN2, and SN3, respectively, which are different from one another. Each of the first through the third transmitting and receiving units 11 to 13 includes first through third transmitting sections and first through third receiving sections which will later be described.

On demand of connection, the first terminal 16 supplies a first transmission request signal and subsequently a first output data signal to the first transmitting and receiving unit 11. Similarly, the second and the third terminals 17 and 18 supply second and third transmission request signals and subsequently second and third output data signals to the second and the third transmitting and receiving units 12 and 13, respectively, on demand of the connection. The first through the third transmitting and receiving units 11 to 13 transmit first through third transmission data signals, respectively, towards the satellite 10. The first transmission data signal includes a first address signal representative of the first address SN1 and the first output data signal. Similarly, the second and the third transmission data signals include second and third address signals and the second and the third output data signals, respectively. Each of the second and the third address signals represents the second and the third addresses SN2 and SN3.

Let the first terminal 16 supply the first transmission request signal to the first transmitting and receiving unit 11. In this event, the first transmitting and receiving unit 11 transmits the first transmission data signal through a first antenna 11a towards the satellite 10. The satellite 10 interconnects between the first earth station and the second and the third earth stations in a star-shaped network fashion. The satellite 10 receives the first transmission data signal and amplifies the first transmission data signal to transmit a first amplified transmission data signal. If the radio transmission path is normal, the first amplified transmission data signal is correctly received at the first and the second earth stations as a first reception data signal within a predetermined time interval after the first transmitting and receiving unit 11 starts transmission of the first transmission data signal. The first transmitting and receiving unit 11 receives the first transmission data signal which is sent back to the first earth station as a returning data signal through the satellite 10 within the predetermined time interval. For example, the predetermined time interval is equal to 0.3 second.

Herein, let the first and the second transmitting and receiving units 11 and 12 transmit the first transmission data signal and the second transmission data signal, respectively, through the single communication channel at the same time. This means that a collision occurs between the first and the second transmission data signals. This is equivalent to the fact that an obstacle occurs in the radio transmission path. In this event, the second transmitting and receiving unit 12 can not correctly receive the first amplified transmission data signal. Therefore, the first transmitting and receiving unit 11 must stop the transmission of the first transmission data signal. In order to stop the transmission of the first transmission data signal on the collision of signals, the first transmitting and receiving unit 11 should detect the fact that the radio transmission path is normal or abnormal. In a manner which will later be described in detail, the first transmitting and receiving unit 11 decides whether or not the radio transmission path is normal by deciding whether or not the first transmitting and receiving unit 11 correctly receives the returning data signal within the predetermined time period after the first transmitting and receiving unit 11 starts the transmission of the first transmission data signal.

Figure 2:
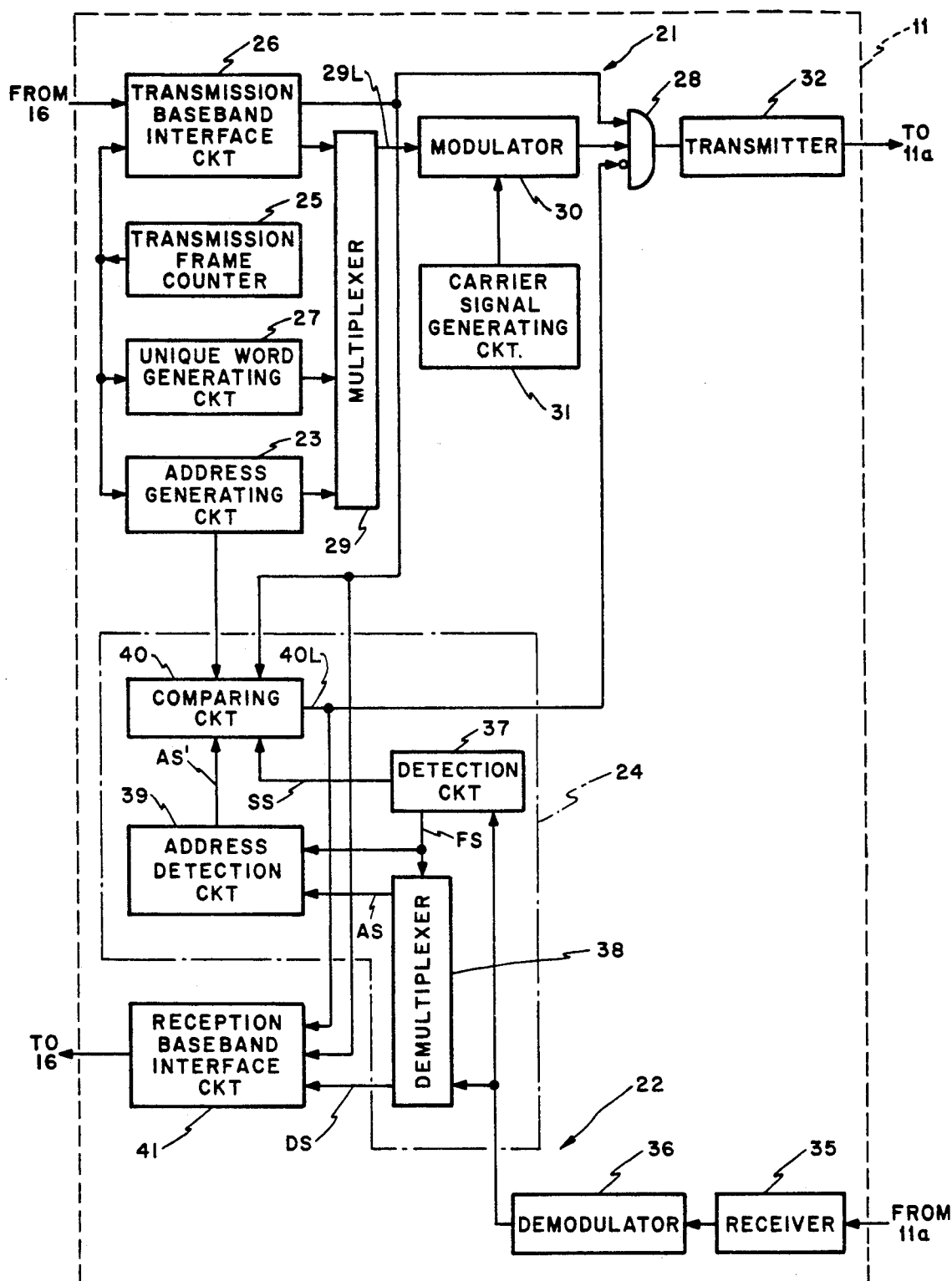
FIG. 2 is a block diagram of an earth station illustrated in FIG. 1.

Referring to FIG. 2, the description will proceed to the first transmitting and receiving unit 11. The description equally well applies to the second and the third transmitting and receiving units 12 and 13. The first transmitting and receiving unit 11 comprises a transmitting section 21, a receiving section 22, an address generating circuit 23, and a decision circuit 24. The transmitting section 21 comprises a transmission frame counter 25 for generating a timing signal to form frame synchronization of the first transmission data signal. The timing signal also serves as a driving signal for driving a transmission baseband interface circuit 26, a unique word generating circuit 27, and the address generating circuit 23. The transmission baseband interface circuit 26 is connected to the first terminal 16 (FIG. 1) and supplies a binary signal having a logic one value to a gate circuit 28 and the decision circuit 24 as a transmission enable signal when the transmission baseband interface circuit 26 is supplied with the first transmission request signal from the first terminal 16. Responsive to the timing signal, the unique word generating circuit 27 generates a first unique word signal representative of a first unique word UW1 in the manner known in the art and delivers the first unique word signal to a multiplexer 29. Simultaneously, the address generating circuit 23 generates a first address signal representative of the first address SN1 in response to the timing signal and sends the first address signal to the multiplexer 29. Supplied with a first output data signal from the first terminal 16, the transmission baseband interface circuit 26 carries out rate conversion of the first output data signal by the use of the timing signal and delivers a first converted data signal representative of first converted data DATA1 to the multiplexer 29. The multiplexer 29 multiplexes the first unique word signal, the first address signal, and the first converted data signal into a multiplexed signal and delivers the multiplexed signal through a supply line 29L to a modulator 30 as a modulator input signal. The supply line 29L serves as supply means.

Figure 3:
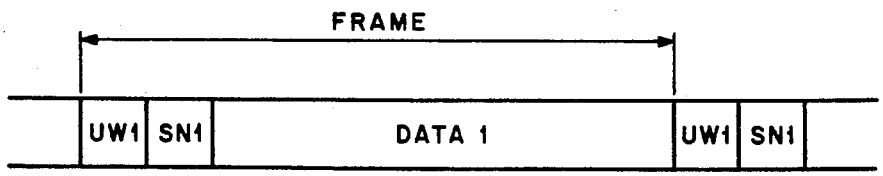
FIG. 3, drawn below

The multiplexed signal comprises the first unique word UW1, the first address SN1, and the first converted data DATA1 in each frame as shown in FIG. 3. A carrier signal generating circuit 31 generates a carrier signal and supplies the carrier signal to the modulator 30. Supplied with the multiplexed signal and the carrier signal, the modulator 30 modulates the carrier signal by the multiplexed signal and delivers a modulated signal to the gate circuit 28. The modulated signal passes through the gate circuit 28 when the transmission baseband interface circuit 26 produces the binary signal with the logic one value and furthermore when the decision circuit 24 does not produce a fault signal as will later be described in detail. A transmitter 32 receives the modulated signal passed through the gate circuit 28. In the manner known in the art, the modulated signal is converted in frequency and then amplified by the transmitter 32 and is transmitted from the transmitter 32 with the predetermined frequency band f0 as the first transmission data signal towards the satellite 10 (FIG. 1).

As described in conjunction with FIG. 1, the satellite 10 receives the first transmission data signal and transmit the first amplified transmission data signal to the first through the third earth stations.

The description will proceed to the receiving section 22 and the decision circuit 24. The receiving section 22 comprises a receiver 35 and a demodulator 36. The returning data signal is received at the receiver 35 as a reception data signal. The reception data signal carries the first unique word signal, the first address signal, and the first output data signal. The receiver 35 carries out amplification and frequency conversion of the reception data signal in the manner known in the art and delivers a converted data signal to the demodulator 36. The demodulator 36 demodulates the converted data signal into a demodulated signal and supplies the demodulated signal to the decision circuit 24. The decision circuit 24 comprises a detection circuit 37, a demultiplexer 38, an address detection circuit 39, and a comparing circuit 40. The detection circuit 37 detects whether or not the first unique word signal is included in the demodulated signal and detects whether or not frame synchronization is established. The detection circuit 37 generates a unique word detection signal on detection of the first unique word signal and produces a frame pulse signal FS in synchronism with the unique word detection signal. The frame pulse signal FS is supplied to the demultiplexer 38 and the address detection circuit 39. The detection circuit 37 further produces a synchronization detection signal SS when the frame synchronization is established. The synchronization detection signal SS is supplied to the comparing circuit 40.

The demultiplexer 38 demultiplexes the demodulated signal into the first address signal and the first output data signal in synchronism with the frame pulse signal FS and produces a first separated address signal AS and a first separated data signal DS. The first separated address signal AS is supplied to the address detection circuit 39 while the first separated data signal DS is supplied to a reception baseband interface circuit 41. The reception baseband interface circuit 41 stops output of the first separated data signal DS when the transmission baseband interface circuit 26 produces the transmission enable signal. The address detection circuit 39 produces the first separated address signal AS as a first detected address signal AS' in response to the frame pulse signal FS. Supplied with the first detected address signal AS' and the transmission enable signal, the comparing circuit 40 compares the first detected address signal AS' with the first address signal during the predetermined time interval after the comparing circuit 40 receives the transmission enable signal. The comparing circuit 40 does not produce the fault signal when the first detected address signal AS' is coincident with the first address signal within the predetermined time interval. In this event, the gate circuit 28 allows the modulated signal to pass therethrough.

On the other hand, the comparing circuit 40 produces the fault signal having a logic one value when the first detected address signal AS' is not coincident with the first address signal within the predetermined time interval. The comparing circuit 40 supplies the fault signal through an output line 40L to the gate circuit 28 and the reception baseband interface circuit 41. In this event, the gate circuit 28 stops passage of the modulated signal while the reception baseband interface circuit 41 produces an alarm signal or a busy tone signal. The gate circuit 28 serves as control means. The alarm signal is for representing an abnormal state of the radio transmission path and supplies to the first terminal 16. Responsive to the alarm signal, the first terminal 16 stops output of the first transmission request signal and the first output data signal.

Figure 4:
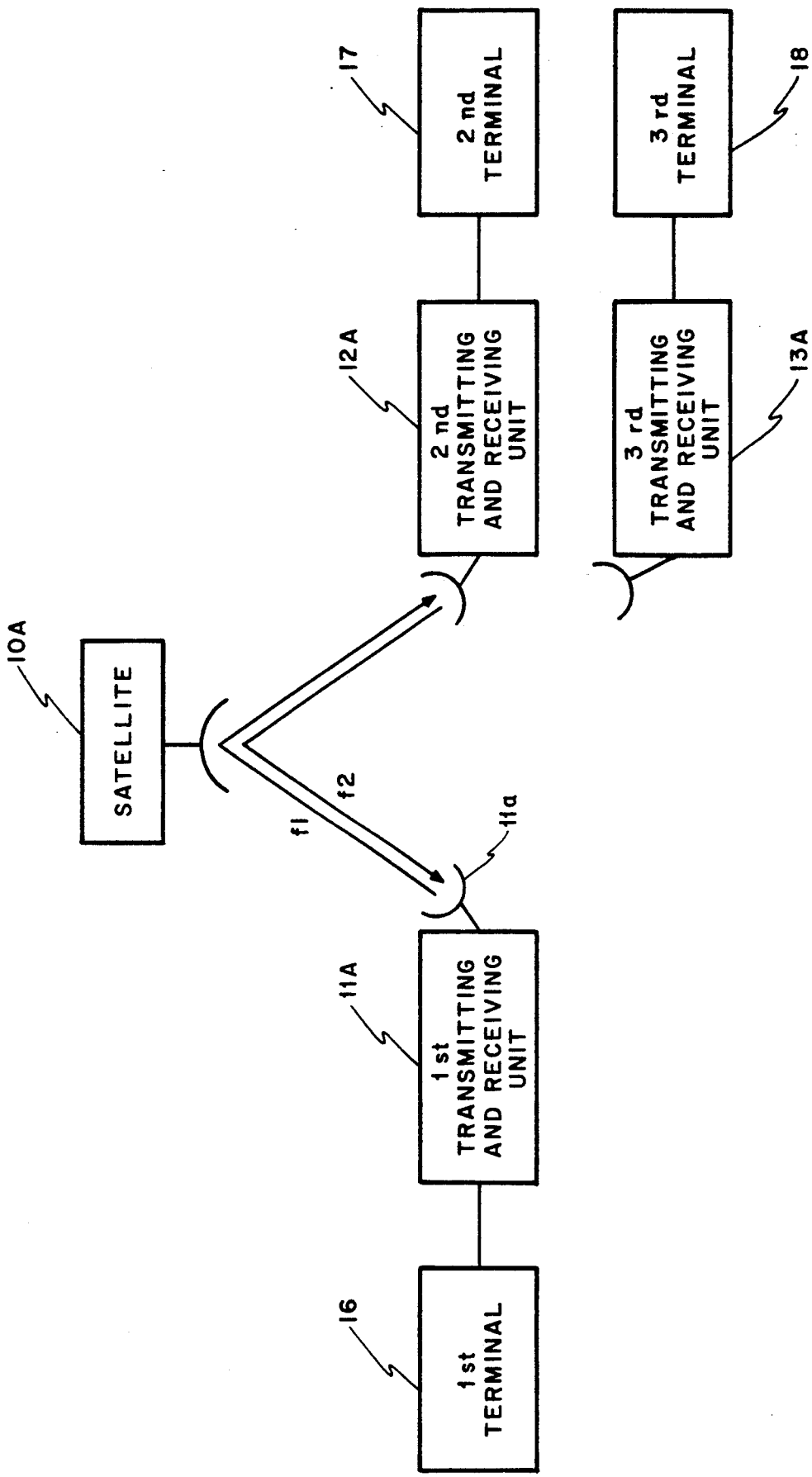
FIG. 4 schematically shows a satellite communication system which comprises a plurality of earth stations according to a second embodiment of this invention.

Referring to FIG. 4, the description will proceed to a satellite communication system including an earth station according to a second embodiment of this invention. The system is also of the type which is called the SCPC system. The system comprises a satellite 10A and a plurality of earth stations which are communicable with each other through the satellite 10A by controllably using first and second frequency bands f1 and f2 by full duplex basis. In the example being illustrated, first through third earth stations are exemplified and include first through third transmitting and receiving units 11A, 12A, and 13A and the first through the third terminals 16, 17, and 18, respectively. The first through the third earth stations have the first through the third addresses SN1, SN2, and SN3, respectively, which are different from one another. The first transmitting and receiving unit 11A comprises a first transmitting section and a first receiving section which will later be described. Similarly, the second transmitting and receiving unit 12A comprises second transmitting and second receiving sections while the third transmitting and receiving unit 13A comprises third transmitting and third receiving sections. Each of the first through the third transmitting sections is operable to select one of the first and the second frequency bands f1 and f2 as a transmission frequency band. Each of the first through the third receiving sections is also operable to select one of the first and the second frequency bands f1 and f2 as a reception frequency band.

It is assumed that each of the first through the third receiving sections selects the first frequency band f1 as the reception frequency band at an initial state, namely, in a stand-by state. Let the first terminal 16 supply the transmission request signal and subsequently the first output data signal to the first transmitting and receiving unit 11A in order to communicate with the second earth station. In this event, the first transmitting section generates a first primary address signal representative of an originating address, namely, the first address SN1 and a first secondary address signal representative of a destination address, namely, the second address SN2 as will later be described in detail. The first transmitting section transmits the first transmission data signal towards the satellite 10A through the first antenna 11a by using the first frequency band f1. Simultaneously, the first receiving section selects the second frequency band f2 as the reception frequency band. The first transmission data signal includes the first output data signal, the first primary address signal, and the first secondary address signal. The satellite 10A receives the first transmission data signal and amplifies the first transmission data signal to transmit a first amplified transmission signal. The first amplified transmission signal is received at the second and the third receiving sections, as a first reception signal, each of which selects the first frequency band f1. In the second transmitting and receiving unit 12A, the first output data signal is separated from the first reception signal as a first separated signal on detection of the second address SN2 in a manner as will later be described. Simultaneously, the second transmitting section selects the second frequency band f2 as the transmission frequency band. Although the third transmitting and receiving unit 13A receives the first amplified transmission signal, the third receiving section can not detect the third address SN3. The third transmitting and receiving unit 13A therefore holds the stand-by state.

In the second earth station, the first separated signal is supplied to the second terminal 17. Supplied with the first separated signal, the second terminal 17 sends a response signal and subsequently the second output data signal to the second transmitting section. Responsive to the response signal, the second transmitting and receiving unit 12A generates a second primary address signal representative of the second address SN2 as another originating address and a second secondary address signal representative of the first address SN1 as another destination address in a manner which will later be described. The second transmitting section transmits the second transmission data signal as a response data signal towards the satellite 10A by using the second frequency band f2.

The satellite 10A receives the response data signal and amplifies the response data signal to transmit an amplified response data signal. The amplified response data signal is received at the first transmitting and receiving unit 11A as a reception response signal. As will later be described, the first transmitting and receiving unit 11A decides whether or not the first receiving section correctly receives the reception response signal within the predetermined time interval after the first transmitting section starts the transmission of the first transmission data signal. The first and the second earth stations are communicable with one another when the first receiving section correctively receive the reception response signal within the predetermined time interval.

Let the third terminal 18 supply the third transmission request signal to the third transmitting and receiving unit 13A during communication between the first and the second earth stations. In this event, the third transmitting and receiving unit 13A delivers the alarm signal to the third terminal 18 and holds the stand-by state because the third receiving section has received the first transmission data signal.

On the other hand, let the first and the third terminals 16 and 18 supply the first and the third transmission request signals to the first and the third transmitting and receiving units 11A and 13A at the same time in order to communicate with the second terminal 17. In this event, the collision occurs between the first and the third transmission data signals. Therefore, the second transmitting and receiving unit 12A does not transmit the second transmission data signal because the second receiving section can not correctly receive the first reception data signal. The first transmitting and receiving unit 11A stops the transmission of the first transmission data signal and supplies the alarm signal to the first terminal 16 because the first receiving section can not correctly receive the reception response signal within the predetermined time interval.

Figure 5:
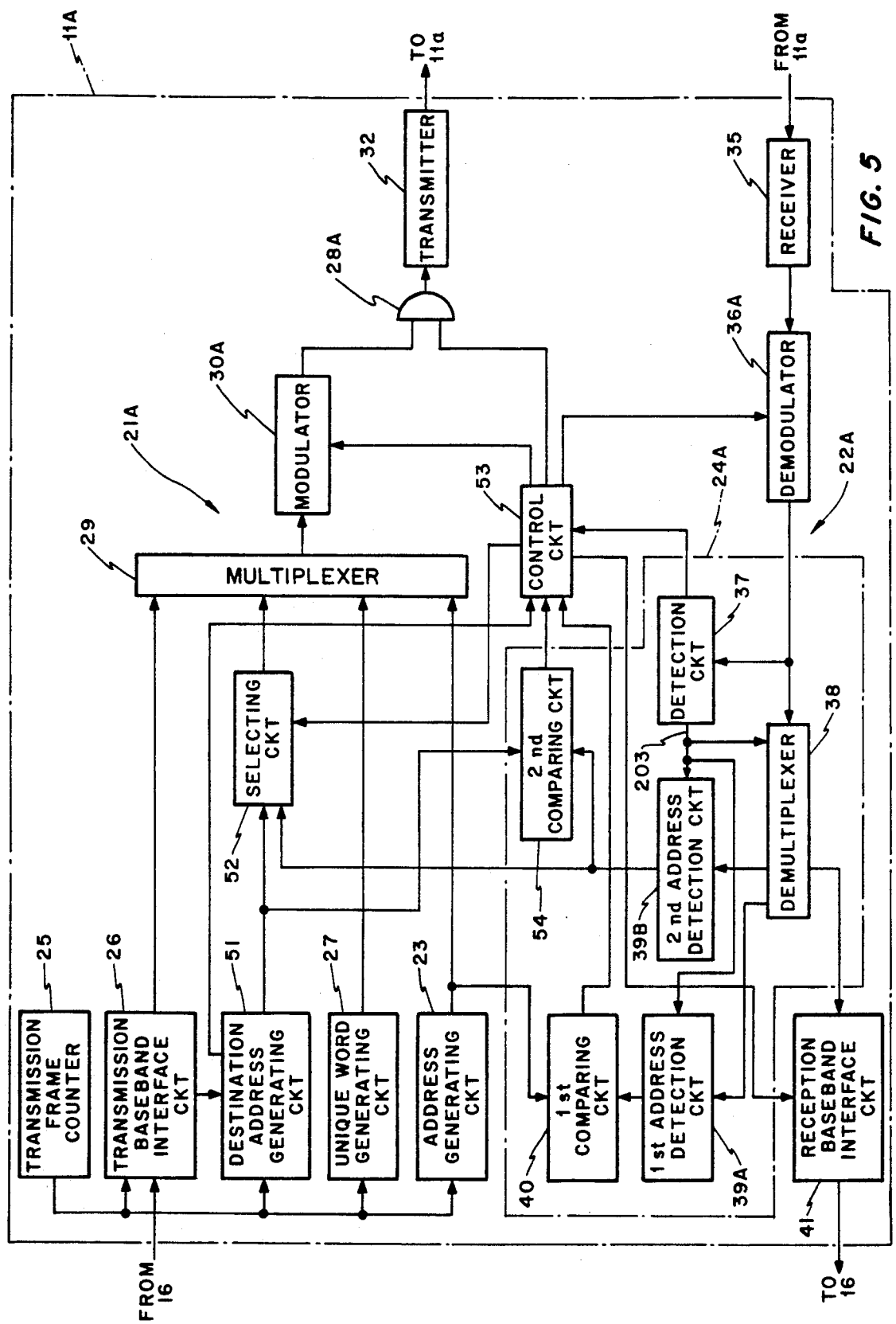
FIG. 5 is a block diagram of an earth station illustrated in FIG. 4.

Referring to FIG. 5, the description will proceed to the first transmitting and receiving unit 11A of the first earth station. The description is equally well applicable to the second and the third transmitting and receiving units 12A and 13A. The first transmitting and receiving unit 11A comprises similar parts designated by like reference numerals as in FIG. 2 except for a first transmitting section 21A, a first receiving section 22A, a decision circuit 24A, a destination address generating circuit 51, a selecting circuit 52, and a control circuit 53. The first transmitting section 21A comprises a modulator 30A. The first receiving section 22A comprises a demodulator 36A. As will later be described, the modulator 30A is operable to select one of the first and the second frequency bands f1 and f2 as the transmission frequency band while the demodulator 36A is operable to select one of the first and the second frequency bands f1 and f2 as the reception frequency band. When the modulator 30A selects one of the first and the second frequency bands f1 and f2, the demodulator 36A selects another one of the first and the second frequency bands f1 and f2. It will be assumed that the communication is carried out between the first and the second earth stations. In the stand-by state, each of the first through the third earth stations select the first frequency band f1 as the reception frequency band.

The transmission frame counter 25 generates a timing signal for driving the address generating circuit 23, the transmission baseband interface circuit 261 the unique word generating circuit 27, and the destination address generating circuit 51. The address generating circuit 23 generates the first address signal representative of the first address SN1 as a first primary address signal in response to the timing signal. The unique word generating circuit 27 generates the unique word signal representative of the unique word UW1 in response to the timing signal. The first primary address signal and the first unique word signal are supplied to the multiplexer 29.

On demand of the connection, the first terminal 16 (FIG. 4) delivers the transmission request signal including a designation signal for designating the second earth station and subsequently the first output data signal representative of first output data DATA1 to the transmission baseband interface circuit 26. Supplied with the transmission request signal, the transmission baseband interface circuit 26 extracts the designation signal from the transmission request signal and supplies an extracted designation signal to the destination address generating circuit 51. Then, the transmission baseband interface circuit 26 carries out rate conversion of the first output data signal by the use of the timing signal and produces a first converted data signal. Responsive to the extracted designation signal, the destination address generating circuit 51 generates a destination address signal representative of a destination address, namely, the second address SN2 as a first secondary address signal and generates a connection demand signal. The first secondary address signal is supplied to the selecting circuit 52 while the connection demand signal is delivered to the control circuit 53. The selecting circuit 52 is controlled by the control circuit 53 so that the selecting circuit 52 selects the first secondary address signal and supplies the first secondary address signal to the multiplexer 29 when the control circuit 53 receives the connection demand signal.

The multiplexer 29 multiplexes the first converted data signal, the first unique word signal, the first primary address signal, and the first secondary address signal into a multiplexed signal. The multiplexed signal is supplied to the modulator 30A as a modulator input signal. The control circuit 53 makes the modulator 30A select the first frequency band f1 as the transmission frequency band while the control circuit 53 receives the connection demand signal. Simultaneously, the control circuit 53 makes the demodulator 36A select the second frequency band f2 as the reception frequency band. The modulator 30A modulates a carrier signal of the first frequency band f1 by the modulator input signal and produces a modulated signal to a gate circuit 28A. The control circuit 53 supplies a binary signal having a logic one value as a transmission enable signal to the gate circuit 28A when the receiving section 22A does not receive the reception data signal and furthermore when the control circuit 53 receives the connection demand signal. When the control circuit 53 produces the transmission enable signal, the modulated signal passes through the gate circuit 28A and is transmitted towards the satellite 10A through the transmitter 32 and the first antenna (not shown) as the first transmission data signal.

Figure 6:
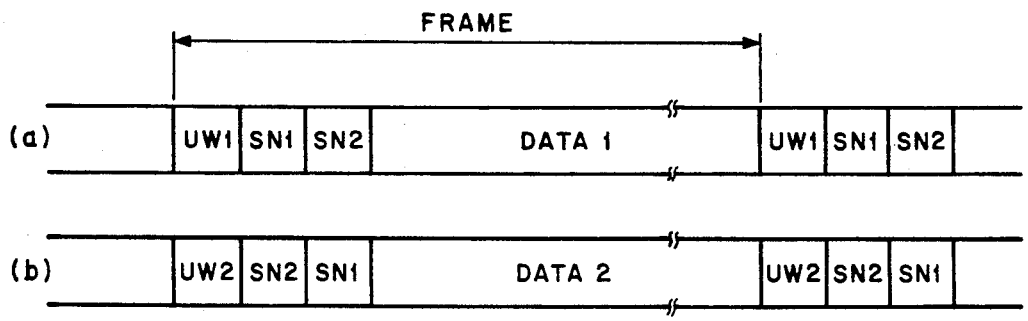
FIG. 6, drawn below

As shown in FIG. 6(a), the first transmission data signal comprises the first unique word signal representative of the first unique word UW1, the first primary address signal representative of the first address SN1, the first secondary address signal representative of the second address SN2, and the first output data signal representative of the first output data DATA1 in each frame.

The description will proceed to the receiving section 22A, and the decision circuit 24A. The decision circuit 24A comprises similar parts designated by like reference numerals as in FIG. 2 except for an additional comparing circuit 54. The comparing circuit 40 and the additional comparing circuit 54 will be called first and second comparing circuits, respectively.

Let the receiving section 22A receive the reception data signal of the first frequency band f1 transmitted from the second earth station when the first earth station is on the stand-by state. This means that the second earth station transmits the second transmission data signal in response to the transmission request signal supplied from the second terminal 17 in the manner described above. In this event, the second transmission data signal may comprise a second unique word signal representative of a second unique word UW2, a second primary address signal representative of the destination address, namely, the first address SN1, a second secondary address signal representative of the originating address, namely, the second address SN2, and a second output data signal representative of second output data DATA2 in each frame as shown in FIG. 6(b). The receiving section 22A receives the second transmission data signal through the receiver 35 as the reception data signal.

In the stand-by state, the demodulator 36A selects the first frequency band f1 as the reception frequency band and demodulates the reception data signal into a demodulated signal. The demodulated signal is supplied to the detection circuit 37 and the demultiplexer 38. As described in conjunction with FIG. 2, the detection circuit 37 produces the detection signal and the frame pulse signal on detection of the frame synchronization of the demodulated signal. The detection signal is supplied to the control circuit 53 while the frame pulse signal is delivered to first and second address detection circuits 39A and 39B and the demultiplexer 38. Responsive to the frame pulse signal, the demultiplexer 38 demultiplexes the demodulated signal into a separated unique word signal, a primary separated address signal, a secondary separated address signal, and a separated data signal, each of which corresponds to the second unique word signal, the second primary address signal, the second secondary address signal, and the second output data signal. The first and the second address detection circuits 39A and 39B produce the primary and the secondary separated address signals, respectively, in response to the frame pulse signal. The first primary address signal and the primary separated address signal are supplied to the first comparing circuit 40. The second comparing circuit 54 is supplied only with the secondary separated address signal because the destination address generating circuit 51 does not generate the first secondary address signal in the stand-by state. The first comparing circuit 40 compares the primary separated address signal with the first primary address signal and produces a first fault signal when the primary separated address signal does not coincide with the first primary address signal. In the example being illustrated, the first comparing circuit 40 does not produce the first fault signal because the primary separated address signal coincides with the first primary address signal. On the other hand, the second comparing circuit 54 does not carry out comparing operation because the second comparing circuit 54 is supplied only with the secondary separated address signal. The control circuit 53 makes the modulator 30A select the second frequency band f2 and makes the selecting circuit 52 select the secondary separated address signal when the control circuit 53 is supplied with the detection signal and furthermore when the first comparing circuit 40 does not produce the first fault signal. Simultaneously, the control circuit 53 supplies the transmission enable signal to the gate circuit 28A. The selecting circuit 52 supplies the secondary separated address signal to the multiplexer 29, The control circuit 53 further makes the reception baseband interface circuit 41 carry out the rate conversion of the separated data signal. The reception baseband interface circuit 41 delivers a converted reception data signal to the first terminal 16 (FIG. 4).

The first terminal 16 produces a first response data signal in response to the converted reception data signal. The first response data signal is supplied to the transmission baseband interface circuit 26. The transmission baseband interface circuit 26 carries out the rate conversion of the first response data signal and delivers a first converted response data signal to the multiplexer 29. The multiplexer 29 multiplexes the first converted response data signal, the first unique word signal, the first primary address signal, and the secondary separated signal into a multiplexed response signal. The multiplexed response signal is modulated by the modulator 30A with the second frequency band f2 into a modulated response signal. The modulated response signal is transmitted through the gate circuit 28A as a first response transmission data signal.

Next, let the receiving section 22A receive the reception data signal of the second frequency band f2 transmitted from the second earth station after the transmitting section 21A starts the transmission of the first transmission data signal. This means that the second earth station transmits a second response transmission data signal in response to a second response data signal supplied from the second terminal 17 in the similar manner described above. In this event, the second response transmission data signal may include the second primary address signal and the second secondary address signal in addition to a second response data signal supplied from the second terminal 17. The second primary address signal represents the destination address, namely, the first address SN1 while the second secondary address signal represents the originating address, namely, the second address SN2. The receiving section 22A receives the second response transmission data signal as a response reception data signal. Inasmuch as the demodulator 36A selects the second frequency band f2 as the reception frequency band after the transmission of the first transmission data signal, the demodulator 36A demodulates the response reception data signal into a demodulated response signal. The demodulated response signal is supplied to the detection circuit 37 and the demultiplexer 38. As described before, the detection circuit 37 produces the detection signal and the frame pulse signal on detection of the frame synchronization of the demodulated response signal. The detection signal is supplied to the control circuit 53 while the frame pulse signal is delivered to the demultiplexer 38. Responsive to the frame pulse signal, the demultiplexer 38 demultiplexes the demodulated response signal into a separated response data signal, the primary separated address signal, and the secondary separated address signal which correspond to the second response data signal, the second primary address signal, and the second secondary address signal. The first primary address signal and the primary separated address signal are supplied to the first comparing circuit 40. The first secondary address signal and the secondary separated address signal are supplied to the second comparing circuit 54. In the illustrated example, the first comparing circuit 40 does not produce the first fault signal because the primary separated address signal coincides with the first primary address signal within the predetermined time interval. Similarly, the second comparing circuit 54 does not produce the second fault signal because the secondary separated address signal coincides with the first secondary address signal within the predetermined time interval. In this event, the control circuit 53 delivers the transmission enable signal to the gate circuit 28A and makes the reception baseband interface circuit 41 carry out the rate conversion of the separated response data signal. The reception baseband interface circuit 41 supplies a converted response data signal to the first terminal 16.

On the other hand, let the first and the third terminals 16 and 18 supply the first and the third transmission request signals to the first and the third transmitting and receiving units 11A and 13A at the same time in order to communicate with the second earth station. In this event, the collision occurs between the first and the third transmission data signals. As a result, the second transmitting and receiving unit 12A can not correctly transmit the second response transmission data signal to the first earth station. This means that the second primary address signal and the second secondary address signal include error data. In this event, the first comparing circuit 40 produces the first fault signal because the primary separated address signal does not coincide with the first primary address signal within the predetermined time interval after the transmitting section 21A starts the transmission of the first transmission data signal. Similarly, the second comparing circuit 54 produces the second fault signal because the secondary separated address signal does not coincide with the first secondary address signal within the predetermined time interval after the transmitting section 21A starts the transmission of the first transmission data signal. Supplied with the first and the second fault signals, the control circuit 53 stops transmission of the first transmission data signal by supplying the binary signal having a logic zero value and makes the reception baseband interface circuit 41 supply the alarm signal or the busy tone signal to the first terminal 16. Supplied with the alarm signal, the first terminal 16 stops production of the transmission request signal and the first output data signal.

Figure 7:
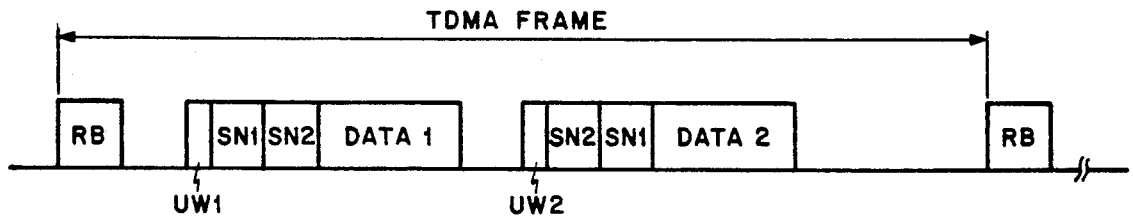
FIG. 7 shows another format of a transmission data signal transmitted from an earth station illustrated in FIG. 5.

While this invention has thus far been described in conjunction with only two preferred embodiments thereof, it will now be readily possible for those skilled in the art to put this invention into practice in various other manners. For example, the earth station according to this invention is applicable to TDMA (time division multiple access) system by using a TDMA format illustrated in FIG. 7. In FIG. 7, a TDMA frame comprises a reference burst RB, a first data burst DB1 allocated to the first earth station, and a second data burst DB2 allocated to the second earth station. The first data burst DB1 comprises the first unique word UW1, the first address SN1, the second address SN2, and the first output data DATA1 while the second data burst DB2 comprises the second unique word UW2, the second address SN2, the first address SN1, and the second output data DATA2. Each of the terminals may be implemented by a telephone sets a facsimile equipment, and a data terminal equipment. Consequently, each earth station can comprise a plurality of terminals. Furthermore, each earth station may comprise a local switching office for connecting each terminal with each transmitting and receiving station.

What is claimed is:

1. An earth station for use in an SCPC (single channel per carrier) satellite communication system, said earth station being communicable with at least one other earth station via a satellite by using a single communication channel on a half duplex basis and also communicable with said other earth station via said satellite by using two communication channels on a full duplex basis, each of said earth station and said other earth station having its own particular address and including a terminal for producing a transmission request signal and subsequently an output data signal, transmitting means comprising modulating means for modulating a modulator input signal into a modulated signal and transmitting said modulated signal as a transmission data signal towards said satellite through said single communication channel when said transmitting means is supplied with said transmission request signal, and receiving means for receiving a reception data signal from said satellite through said single communication channel, wherein an improvement comprises:

generating means for generating an address signal which is representative of said particular address;
a multiplexer connected to said terminal and said generating means for multiplexing said output data signal and said address signal into a multiplexed signal;

supply means connected to said multiplexer and said transmitting means for supplying said multiplexed signal to said transmitting means via said modulating means as said modulated signal, said reception data signal comprising the transmission data signal which is sent back to said receiving means as a returning data signal through said satellite;

deciding means connected to said transmitting and said receiving means for deciding whether or not said receiving means already receives signals from other earth stations when said transmitting means starts to transmit and whether or not said receiving means receives said returning data signal as said reception data signal within a predetermined time interval after said transmitting means starts transmission of said transmission data signal, said deciding means producing a fault signal when said receiving means already receives signals from other of said earth stations when said transmitting means starts to transmit and said receiving means does not detect said particular address within said predetermined time interval; and control means connected to said transmitting means and said deciding means for controlling said transmitting means to keep said transmission when said deciding means does not produce said fault signal and to stop said transmission when said deciding means produces said fault signal.

2. An earth station as claimed in claim 1, wherein said receiving means is connected to said terminal, and wherein said receiving means delivers an alarm signal to said terminal when said deciding means produces said fault signal.

3. An earth station as claimed in claim 1, wherein said deciding means comprises:

a demultiplexer connected to said receiving means for demultiplexing said returning data signal into a demultiplexed data signal and a separated signal corresponding to said output data signal and said address signal; and comparing means connected to said transmitting and said generating means and to said demultiplexer for comparing said separated signal with said address signal during said predetermined time interval to produce said fault signal when said separated signal does not coincide with said address signal.

* * * * *